United States Patent [19]

Shimizu

[11] Patent Number: 4,737,856

[45] Date of Patent: Apr. 12, 1988

[54] IMAGE PROCESSING APPARATUS

[75] Inventor: Katsuichi Shimizu, Kunitachi, Japan

[73] Assignee: Canon Kabushiki Kaisha, Tokyo, Japan

[21] Appl. No.: 643,462

[22] Filed: Aug. 23, 1984

[30] Foreign Application Priority Data

Sep. 1, 1983 [JP] Japan .................................. 58-160675

[51] Int. Cl.$^4$ .............................................. H04H 1/04
[52] U.S. Cl. ..................................... 358/285; 358/293; 355/14 SH
[58] Field of Search ............... 358/293, 294, 280, 285; 355/8, 14 SH; 250/206, 557, 560, 561

[56] References Cited

U.S. PATENT DOCUMENTS

| 4,424,535 | 1/1984 | Rothbart et al. | 358/293 |
| 4,439,790 | 3/1984 | Yoshida | 358/293 |
| 4,506,302 | 3/1985 | Kurata | 358/293 |

Primary Examiner—Edward L. Coles, Sr.
Attorney, Agent, or Firm—Fitzpatrick, Cella, Harper & Scinto

[57] ABSTRACT

An image processing apparatus has a reading device for reading an original, a conveying device for conveying the original to a predetermined reading position, a first detecting device for detecting the state of the original on the basis of the output of the reading device, and second detecting device for detecting the state of the original conveyed by the conveying device. The first detecting device is used to detect the state of the original when the conveying device is not used.

39 Claims, 7 Drawing Sheets

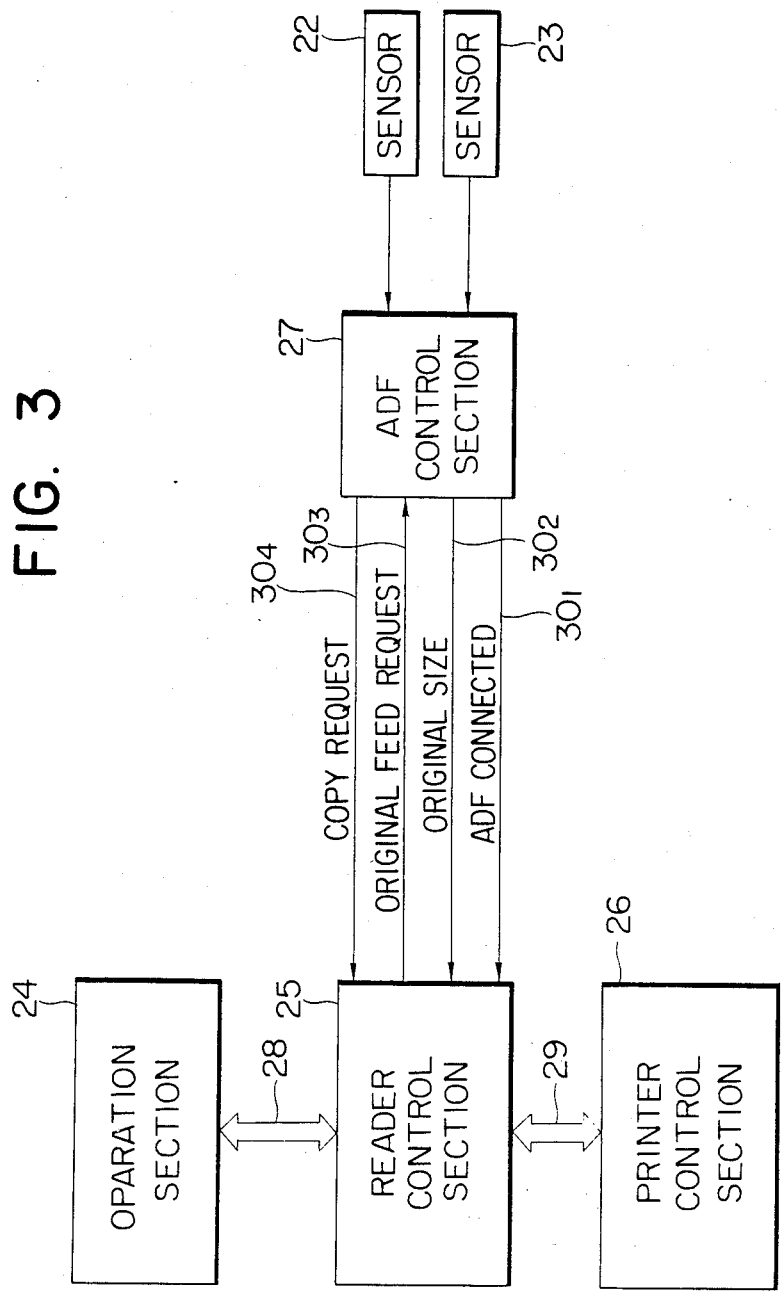

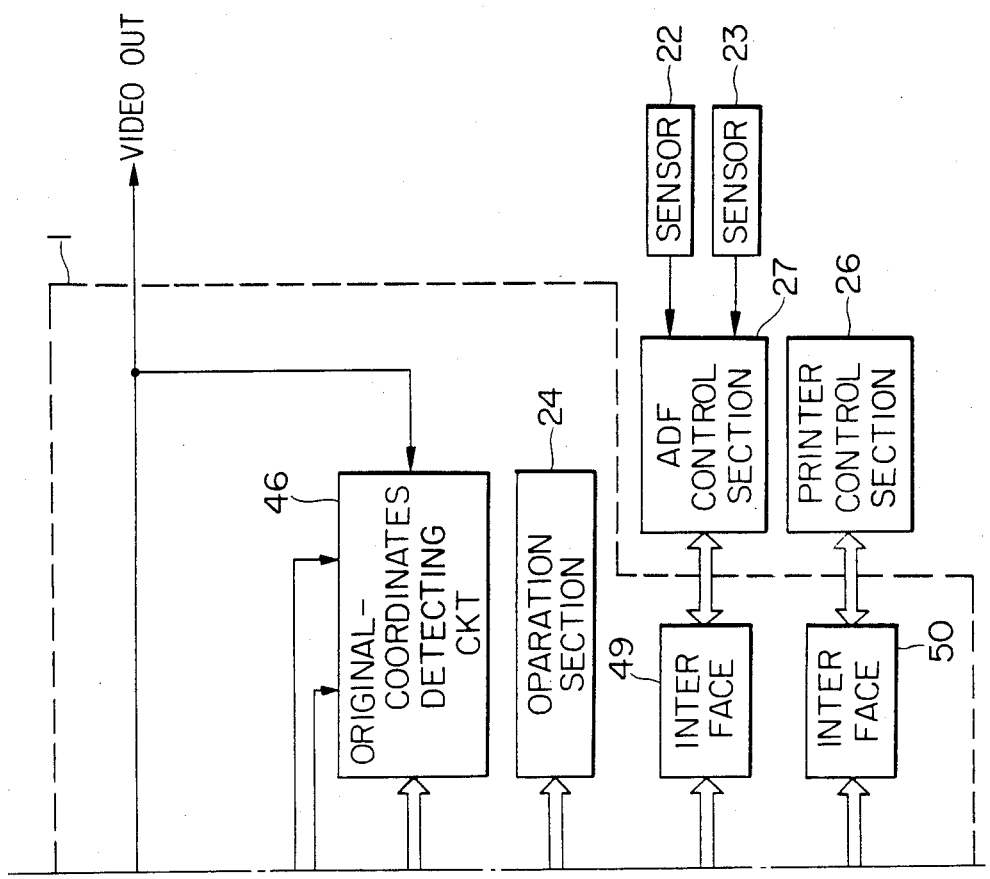

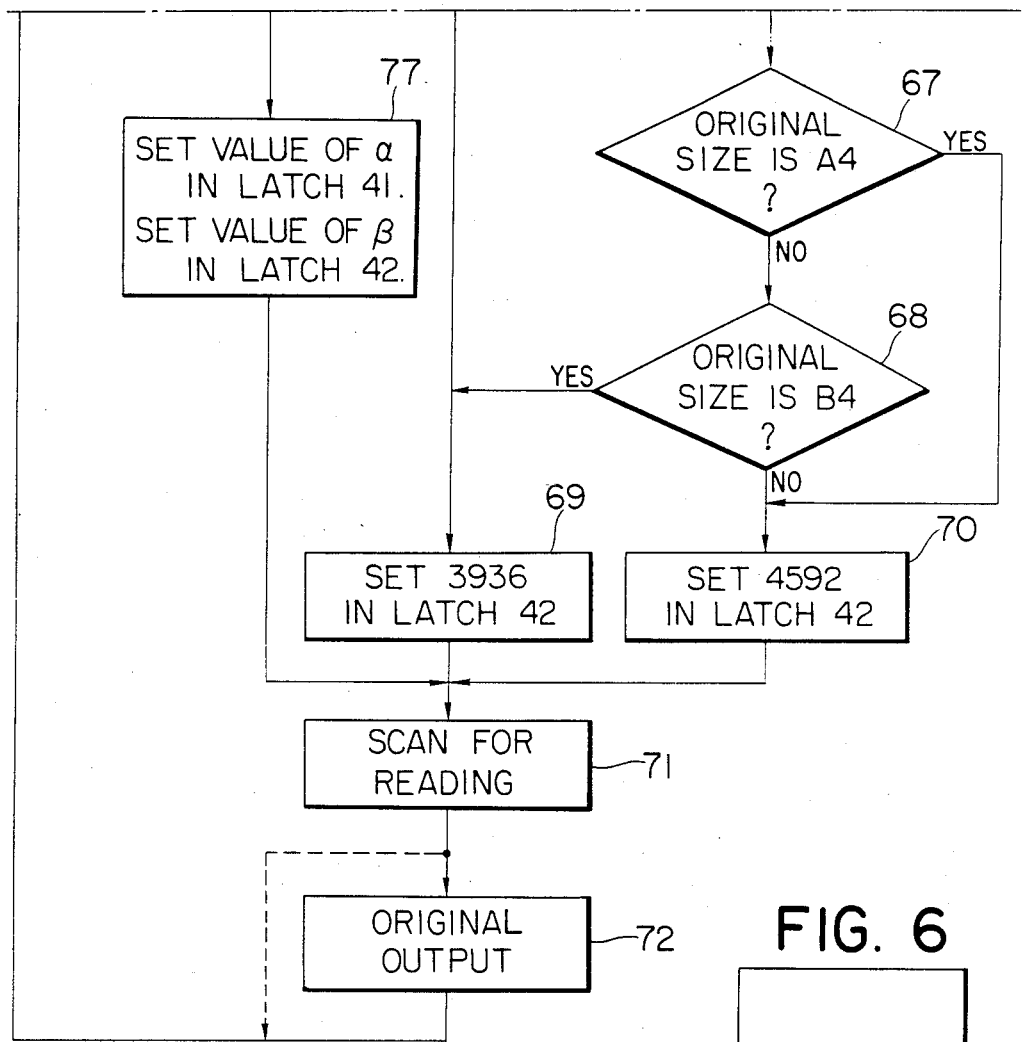

IMAGE PROCESSING APPARATUS

BACKGROUND OF THE INVENTION

1. Field of the Invention

This invention relates to an image processing apparatus for converting the image of an original into an electrical signal.

2. Description of the Prior Art

In an apparatus for converting the image of an original into an electrical signal and reading the same, unlike a conventional copying apparatus or the like in which light is applied to the image of an original and the reflected image thereof is optically handled, the image of the original is converted into an electrical signal and therefore, by subjecting this signal to various logical processings, accurate automatic recognition of the position at which the original is supported and the size of the original can be accomplished.

For example, an original cover for fixing the original to an original carriage in detecting the original is colored differently from the texture of the original which is black or otherwise colored, preliminary scanning is effected to detect the supported position of the original on the original carriage, the timing at which an original image reading circuit functions is controlled on the basis of the detection information so as to be within the area of the original, and a signal output in which any useless image other than the original has been eliminated is effected. On the other hand, to process a great quantity of originals at a high speed, it is preferable to provide an automatic original feeding mechanism for conveying the originals onto the original carriage. However, if the preliminary scanning for the previously described detection of the state of the original is effected each time an original is fed, there is a disadvantage that a hindrance will occur to the intended high-speed processing.

Also, the shapes of the originals supported on the original carriage are various and it has been difficult to always effect good automatic recognition with respect to these originals.

SUMMARY OF THE INVENTION

It is an object of the present invention to eliminate the above-noted disadvantages.

It is another object of the present invention to improve an image processing apparatus.

It is still another object of the present invention to provide an image processing apparatus which enables the processing of the images of originals to be efficiently effected.

It is yet another object of the present invention to provide an image processing apparatus which is capable of effecting high-speed processing.

It is a further object of the present invention to provide an image processing apparatus which is capable of detecting the state of an original.

It is still a further object of the present invention to provide an image processing apparatus which is capable of quickly detecting the state of an original.

It is yet a further object of the present invention to provide an image processing apparatus in which wrong detection of the density of an original is prevented.

It is another object of the present invention to provide an image processing apparatus which detects the density of an original in a detection area corresponding to the size of the original.

Other objects of the present invention will become apparent from the following detailed description taken in conjunction with the accompanying drawings and from the appended claims.

BRIEF DESCRIPTION OF THE DRAWINGS

FIG. 3 is a block diagram showing the connections between various control sections constituting the copying system.

DESCRIPTION OF THE PREFERRED EMBODIMENT

Figure 1:
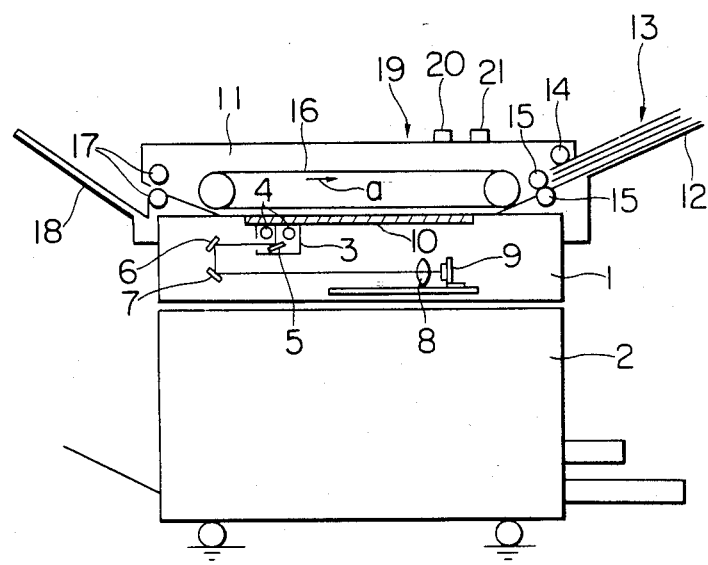
FIG. 1 is a pictorial view showing an original image copying system.

A preferred embodiment of the present invention will hereinafter be described in detail by reference to the drawings. Referring to FIG. 1 which is a pictorial view showing a system for copying the image of an original, reference numeral 1 designates an image reading apparatus (hereinafter referred to as the reader) according to an embodiment of the present invention which is shown in cross-section. Reference numeral 2 denotes a printer apparatus comprising a laser beam printer or an ink jet printer for printing out the image as an aggregate of dots on the basis of an electrical image reading signal from the reader 1.

In the reader 1, reference numeral 3 designates an optical scanning unit, reference numeral 4 denotes an original illuminating lamp, reference numerals 5-7 designate reflecting mirrors, reference numeral 8 denotes a lens, reference numeral 9 designates a line sensor (CCD) for reading the image of the original on each line and scanning the same, and reference numeral 10 designates an original carriage. In such construction, the reflected light of the light which has been applied to the original during the scanning of the original is directed to the lens 8 via the reflecting mirrors 5-7 and is imaged on the CCD 9. The optical scanning unit 3 and the mirrors 6 and 7 are reciprocally moved at a predetermined speed to read the whole surface of the original. An automatic original feeding device (hereinafter referred to as the ADF) 11 is provided on top of the reader 1. In the ADF 11, originals 13 piled on a hopper 12 are separated one by one from above by a friction roller 14 and fed onto the original carriage 10 by a paper feeding roller 15. On the original carriage 10, a conveyor belt 16 is moved round in the direction of arrow a and advances the fed original to a predetermined position and stop the original thereat. In the predetermined position, the optical scanning unit 3 reads and scans the image of the original. The original thus read is discharged into a stacker 18 through paper discharge rollers 17 and the next original is fed from the hopper 12 onto the original carriage 10. The conveyor belt 16 is of a color distinguishable from the texture of the originals.

The ADF 11 is designed to be opened by a hinge, not shown, and it is opened when the ADF is not used or when an original is jammed in the ADF. An operating panel 19 is provided in the reader 1, and a start key 20, an ADF start key 21 and a display device for displaying the number of copies, the abnormal state, etc. are provided on the operating panel. The reader of this embodiment operates in a start mode in which pre-scan is effected to detect the supported state of the original each time when the start key 20 is depressed. Also, it operates in an ADF start mode in which pre-scan is not effected but the continuous reading process of the original is effected when the ADF start key 21 is depressed.

Figure 2:
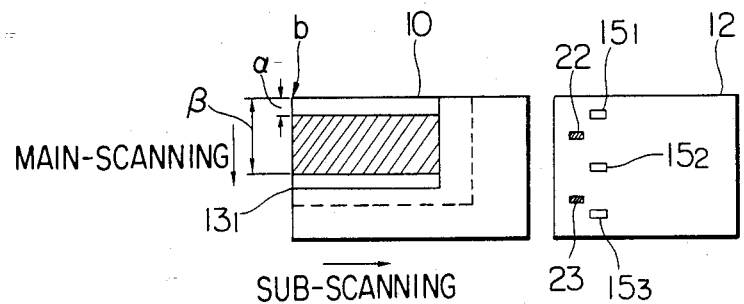
FIG. 2 is a conceptional view for illustrating the control along the paper feeding path of an image reading apparatus according to an embodiment of the present invention.

FIG. 2 is a conceptional view for illustrating the control along the original feeding route with respect to the reader of the embodiment. When the paper feeding hopper is viewed from above it, it is seen that three paper feeding rollers $15_1$–$15_3$ are disposed, and paper sensors 22 and 23 each comprising a simple light-emitting portion and a simple light-receiving portion are provided forwardly of the paper feeding rollers.

These paper sensors 22 and 23 are disposed at a predetermined interval so as to detect the width of the original in the major scanning direction. That is, the width of the original is discriminated between a case where only the sensor 22 detects the original and a case where both of the sensors 22 and 23 detect the original. If the number of such sensors is increased, the accuracy of the detection of the width of the original will be correspondingly increased, but when originals of the standard width are used, the number of sensors can be decreased and this leads to a simplified construction. Also, the length of the original in the minor scanning direction may be known by measuring the time during which at least one of the sensors detects the original conveyed at a predetermined speed. Next, when the original carriage 10 is viewed from above it, it is seen that the original supporting standard is provided at the location of arrow b, and the original fed in from the hopper 12 is stopped with its leading end edge adjusted to this position, whereby the image of the original is read by the system of the optical scanning unit 3 and the CCD 9. The direction in which, at this time, the CCD 9 electrically scans the original is called the major scanning direction, and the direction in which the optical scanning unit 3 mechanically scans the original is called the minor scanning direction. Reference numeral $13_1$ designates the original stopped at the supporting standard position.

FIG. 3 is a block diagram showing the connections between various control sections which constitute the copying system. In FIG. 3, reference numeral 24 designates an operation section, reference numeral 25 denotes a reader control section, and reference numeral 26 designates a printer control section. These sections are connected together by cables 28 and 29. Reference numeral 27 designates an ADF control section, and a signal line is provided between the ADF control section and the reader control section 25. The reader of the embodiment effects give and take of a predetermined signal between it and the ADF control section 27 to enable continuous processing of the original to be accomplished. Specifically describing this, it is always known by the ADF connection signal from the ADF control section 27 through a signal line $30_1$ that the reader body is equipped with the ADF. When the ADF start key 21 is depressed in the operation section 24, the reader control section 25 examines the conditions of the reader and the printer and if they are in a condition in which they can effect the copying operation, an original feed request signal is put out to the ADF control section 27 through a signal line $30_3$. In response thereto, the ADF control section 27 drives the roller 14 and the original is fed toward the original carriage of the reader by rollers $15_1$–$15_3$ and, when the leading end edge of the original arrives at the standard position b, the conveyance of the original is stopped, and a copy request signal is delivered to the reader control section 25 through a signal line $30_4$. Also, the original size information obtained at this time on the basis of the outputs of the paper sensors 22 and 23 is delivered through a signal line $30_2$. Thereafter, the reader 1 enters the copying operation while controlling the printer 2.

Figure 4A:
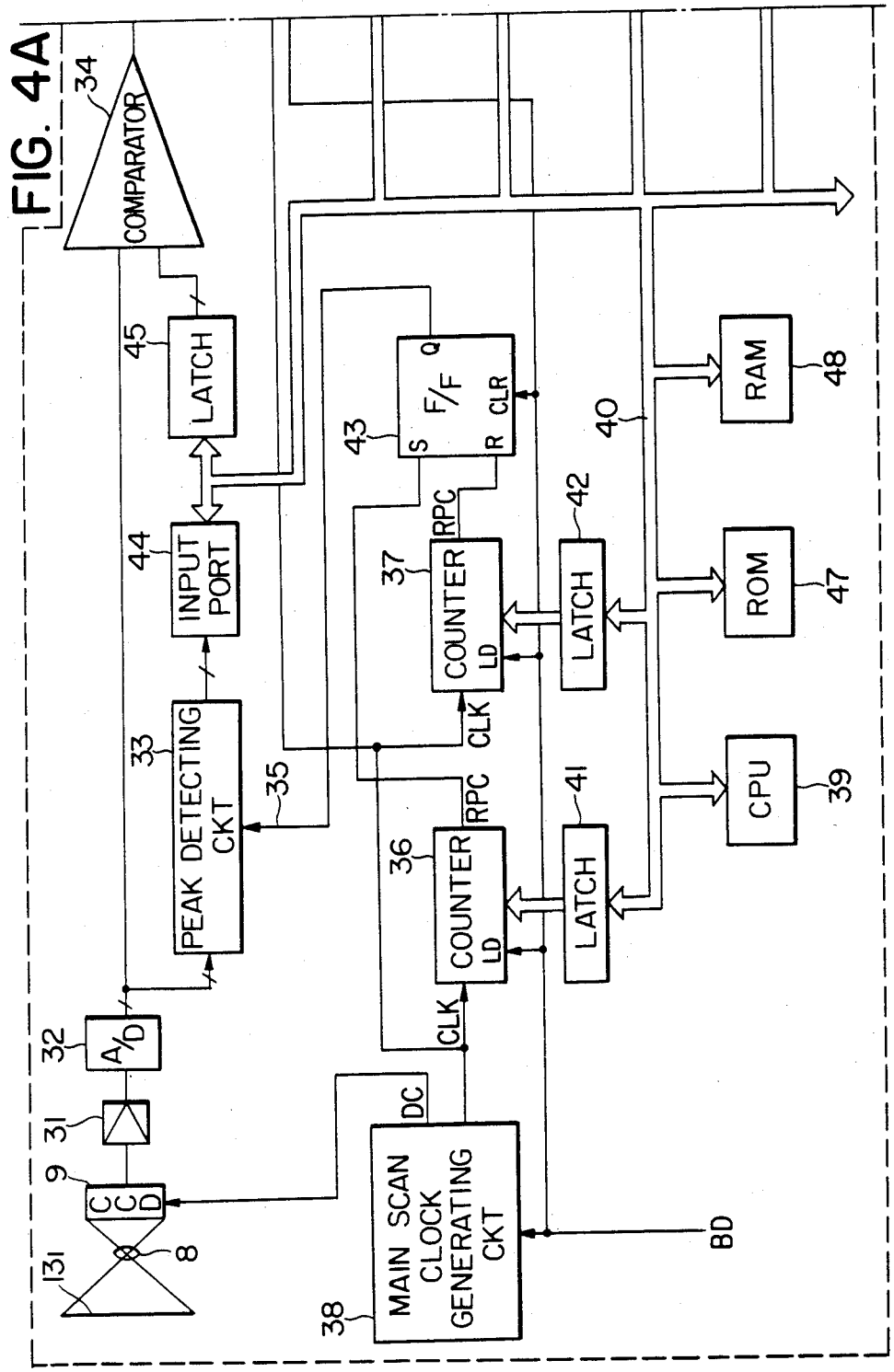
FIG. 4 composed of FIGS. 4A and 4B is a block diagram showing in greater detail the construction of the image reading apparatus according to the embodiment of the present invention.

FIG. 4 is a block diagram showing the construction of the reader 1 in more detail. In FIG. 4, elements similar to those previously described are given similar reference numerals. Now, the image of the original $13_1$ is formed on the CCD 9 through the lens 8 and converted into an electrical signal corresponding to the incident light level when the reader reads the original at a predetermined position on the original carriage. The electrical signal is amplified by an amplifier 31, whereafter it is converted into a digital value of a predetermined bit by an A/D converter 32 and is input to a peak detecting circuit 33 and a comparator 34. The peak detecting circuit 33 is a circuit for detecting and holding the maximum value (the maximum black level value) of the image signal obtained in the one major scanning frame of the CCD 9. To properly detect the maximum value of the image signal obtained by the reading of the original, there must be effected the processing in which the signals of the other members (the conveyor belt, etc.) than the original are not input to the peak detecting circuit 33. For this purpose, a signal having a pulse width corresponding to the time range in which the peak detection is effected is imparted to the other input of the peak detecting circuit 33 through a signal line 35. This time range is given as the gate time range in the major scanning width corresponding to the size of the original, and describing it in connection with FIG. 2, it is a time range which provides the major scanning width indicated by hatching. In the embodiment illustrated, the peak detecting circuit is designed to be operated at a distance $\alpha$ (10 mm) from the standard position b of FIG. 2. The originals are usually supported on the hopper 12 with one side edge thereof adjusted to the side on which there is the supporting standard position b and therefore, after having been fed and conveyed, the originals can be stopped substantially in a predetermined state as indicated by the original $13_1$. However, the stopped state is not always accurate due to various causes when the originals are conveyed particularly in the ADF mode. Accordingly, for the sake of safety, the peak detection is caused to function from a location distant from the standard position b by $\alpha$. By this, even when the end of the original is not coincident with the standard position, the signal obtained by reading the conveyor belt 16 can be prevented from being rendered into a peak value.

Figure 5:
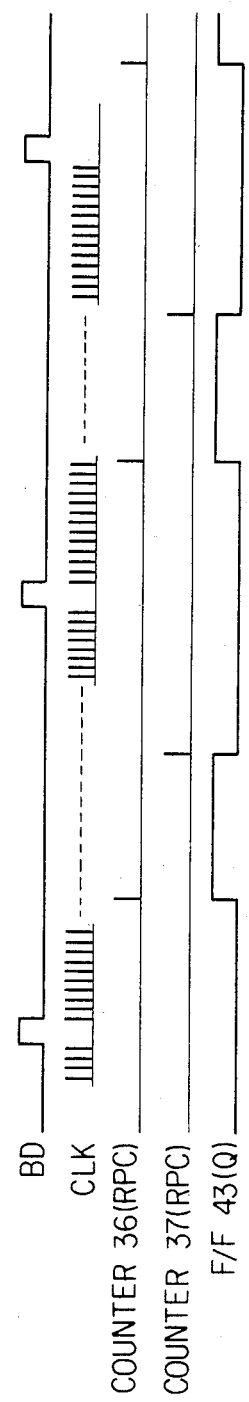
FIG. 5 is a timing chart showing the major operations of the construction of FIG. 4.

When the peak detecting operation should be terminated is related to the original size information supplied from an ADF control section 27. Again in this case, for the same reason as that set forth previously, the function of the peak detecting circuit is stopped before the actual widthwise end of the original is reached. In FIG. 2, the distance corresponding to this termination of the peak detection is $\beta$. Turning back to FIG. 4, counters 36 and 37 produce the timings of the peak detecting circuit which correspond to $\alpha$ and $\beta$. The counters 36 and 37 are counted by a clock signal CLK synchronized with the CCD driving clock DC from a major scanning clock generating circuit 38 which generates a driving clock for CCD 9. The counter 36 is adapted to count a time corresponding to the distance $\alpha$ of FIG. 2, and the counter 37 is adapted to count a time corresponding to the distance $\beta$ of FIG. 2. These count values are determined by the original size information received in advance from the ADF control section 27 through an I/O bus 40 by CPU 39 and are set by latches 41 and 42. The contents of the latches 41 and 42 are loaded into the counters 36 and 37 in synchronism with a major scanning synchronizing signal BD. The major scanning clock generating circuit is synchronized with the signal BD and one clock period corresponds to the time required for reading out a picture element of the CCD. Since the present embodiment is an apparatus having a resolution of 16 lines/mm, $\alpha$ of FIG. 2 is 10 mm and if the original is an original having a width of A4 (297 mm), $\beta$ is 287 mm if up to 10 mm is the peak detection range. Accordingly, the value set in the latch 41 is $10 \times 16 = 160$ and the value set in the latch 42 is $287 \times 16 = 4592$. As regards the operation thereafter, when the signal BD is input each time one major scanning frame is read out, the content 160 of the latch 41 and the content 4592 of the latch 42 are loaded into the counters 36 and 37, respectively. Subsequently, the counters are decremented by one each by the clock signal CLK, and first the counter 36 counts down up to 0. When the count value of the counter 36 become 0, a borrow signal RPC is generated and a flip-flop (F/F) 43 is set. When the F/F 43 is set, the peak detecting circuit 33 operates. The reading-out is further continued and the counter 37 counts down up to 0 and further, a borrow signal RPC is generated and the F/F 43 is reset. When the F/F 43 is reset, the operation of the peak detecting circuit 33 is stopped. Consequently, a time width signal corresponding to the section indicated by the hatching of FIG. 2 is generated in the F/F 43 to control the function of the peak detecting circuit 33 effectively. The timing chart of the above-described operation of the counters 36 and 37 is shown in FIG. 5. If the original is of a width of B5 (256 mm), the value set in the latch 42 which corresponds to B is $246 \times 16 = 3936$ with an error of 10 mm estimated therein.

Thus, the peak value of the image data in each major scanning frame is accurately detected and held by the peak detecting circuit 33. The CPU 39 reads the peak value through an input port 44 at a point of time whereat each major scanning is terminated and on the basis thereof, it calculates the slice level data for binarizing the image signal of the major scanning line. The result of the calculation is imparted to the latch 45, and a comparator 34 binarizes the video data in accordance with this slice level. Also, along with the minor scanning of the image of the original, initiation and termination of the reading are easily controlled in accordance with the information regarding the size of the original. That is, the CPU 39 may count the number of major scanning frames or the number of signals corresponding to the number of major scanning frames and may effect a control in which for example, from the nth frame to the (n+m)th frame are read. In the other frames, a maximum value is set in the latches 41 and 42 to thereby suppress the generation of the borrow signal and inhibit the operation of the peak value detecting circuit 33 except during the reading of the original. In this manner, a plurality of originals can be continuously processed at a high speed.

Also, the reader of the present embodiment operates in the processing mode which involves preliminary scanning before the reading of the original. As previously described, this mode is provided by depressing the start key 20. This mode is used when the ADF mechanism is not utilized. Also, in the present embodiment, the processing mode which involves preliminary scanning can be used even when the ADF mechanism is utilized, or when it is desired to accurately seize the stopped condition of the original or when it is desired to effect the reading of other originals than those of predetermined sizes. That is, preliminary scanning is first effected to examine the placed (stopped) condition of the original after the original has been placed (or stopped) at a predetermined position by the ADF mechanism or manually. The principal purpose of the preliminary scanning is to discriminate between the texture of the original and the conveyor belt or the original carriage and therefore, the preliminary scanning can be achieved by imparting a suitable slice value to the latch 45 in advance and binarizing the video signal. The value binarized by the comparator 34 is analyzed and held by an original-coordinates detecting circuit 46. Next, when the actual reading is effected, the information on the size of the original and the placed position of the original is calculated on the basis of the discrimination information obtained by a preliminary operation and, in a manner similar to that previously described, the reading of the image of the original using a slice level based also on the peak value detection of the original can be effected. Detection of the size of the original and the placed position of the original can also be accomplished with the ADF opened or removed.

Also, if the optical system 3 is set at a reversed position, i.e., most rightwardly, detection of the size and peak of the original can be effected during the conveyance of the original by the ADF. Moreover, in this case, any special detecting means becomes unnecessary and it may be provided by the optical system 3 and CCD 9.

Reference numeral 47 designates a ROM containing the processing program of the CPU 39 therein, reference numeral 48 denotes a RAM which the CPU 39 uses as a work area, reference numeral 49 designates an interface for connecting the CPU 39 to the ADF control section 27, and reference numeral 50 denotes an interface for connecting the CPU 39 to the printer control section. The CPU 39 causes the processing procedure of the copying system to progress by such a construction.

Figure 6A:
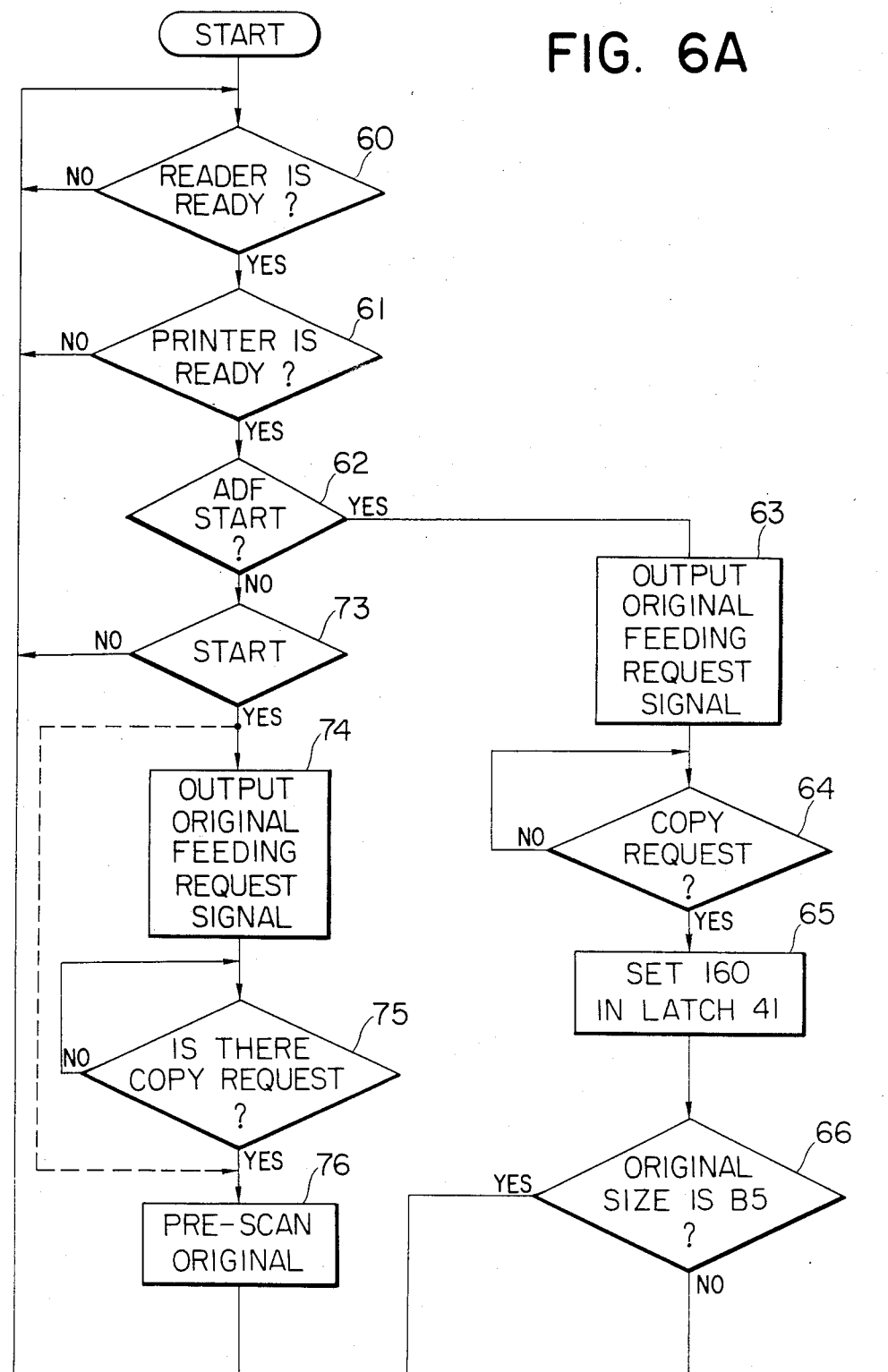
FIG. 6 composed of FIGS. 6A and 6B is a flow chart showing the main control processing procedure of the image reading apparatus according to the embodiment of the present invention.

FIG. 6 is a flow chart showing the processing procedure of the CPU 39. The execution program of this flow chart is pre-stored in the ROM 47. When the main switch of the system is closed, the routine is started. At step 60, whether the reader is ready is discriminated. Where the reader is operatively associated with the automatic original feeding mechanism, it is one of the ready conditions that originals are supported on the hopper 12. If the result of the discrimination at step 60 is "No", the program waits until the reader becomes ready. If the result of the discrimination is "Yes"

whether the printer is ready is discriminated at step 61. It is also one of the ready conditions that copying paper is loaded into the printer. If the result of the discrimination at step 61 is "No", the program likewise waits until the printer becomes ready. When the result of the discrimination is "Yes", whether the ADF starts is discriminated at step 62. When the ADF start key 21 is depressed, the result of this discrimination is "Yes" until the originals on the hopper 12 become exhausted unless there is another stop condition. The presence of the originals on the hopper is detected by a sensor, not shown. The flow proceeds to step 63, at which an original feeding request signal is delivered to the ADF control section. At step 64, the program waits for an original to be conveyed and stopped at a predetermined position on the original carriage. If this condition is satisfied, the result of the discrimination at step 64 become "Yes" and the program proceeds to step 65. At step 65, a predetermined value 160 corresponding to the distance $\alpha$ is set in the latch 41. Also, the ADF control section detects the size of the original by the sensors 22 and 23 when the original is conveyed along the paper feeding path. The CPU 39 receives this information through the interface 49, whereafter at steps 66–67, the size of the original is judged. If the size of the original is B5 or B4, the program proceeds to step 69 and, as previously described, 3936 corresponding to the distance $\beta$ is set in the latch 42. Also, if the size of the original is A4 or neither B5 or B4, the program proceeds to step 70 and 4592 is set in the latch 42. This is because the width of A4 (297 mm) substantially corresponds to the maximum copy width in the present embodiment. At step 71, original image reading and scanning are effected. The reading width of the minor scanning is controlled by the CPU 39 counting the number of major scanning frames, as previously described. Simultaneously with the reading and scanning, a binarized video out signal representative of the image information of the original is supplied to the printer, whereby copying is effected. When the reading and scanning are terminated, the program proceeds to step 72, at which the original discharge control is started and the original is discharged into the stacker 18. The flow then returns to step 60, but when the automatic original feeding mechanism is interlocked, the program will be caused to wait at step 60 during the time that the paper discharging process proceeds to a predetermined stage. That is, the reader will not become ready unless the preceding original is discharged. When the discrimination at steps 60, 61 and 62 is soon satisfied, the program reaches step 63. At step 63, the next original feeding request signal is put out. In this manner, a plurality of originals are continuously processed without preliminary scanning. The sizes of the plurality of originals conveyed from the hopper 12 need not be constant. That is, if the originals are supported on the hopper 12 with one side edge thereof adjusted to the supporting standard position side as previously described, the originals are adapted to be pushed toward the supporting standard position during the conveyance thereof because the conveyance path is stable. This effect is obtained by slightly inclining the conveyor roller from the direction of conveyance toward the supporting standard position side. Accordingly, the leading end edge of the original is stopped substantially reliably at a predetermined standard position. Thus, the reader can accurately read and scan the sizes of various originals without effecting preliminary scanning because the sizes of the originals are detected by the sensors 22 and 23 during the conveyance of the originals by the ADF.

If the ADF is not started at step 62, the program proceeds to step 73. At step 73, whether the ADF should be started is discriminated. If the start key 20 is depressed, the result of the discrimination becomes "Yes" and the program proceeds to step 74. In this case, there are two states. One of the states is the start mode in a case where the ADF is interlocked with the automatic original feeding mechanism. At step 74, the original feeding request signal is put out to the ADF control section. At step 75, the copy request signal from the ADF control section is waited for. At step 76, preliminary original scanning is effected. This displays the effect that accurate reading of the area can be accomplished even when originals of other sizes than the standard size are to be read. At step 77, values corresponding to the distances $\alpha$ and $\beta$ are set in the latches 41 and 42 on the basis of the data of the size of the original and the supported position thereof obtained at the preliminary scanning. Next, at step 71, the actual reading and scanning are effected. The procedure thereafter is similar to that during the ADF start mode.

Another state is the start mode in a case where the automatic original feeding mechanism is not used. In this case, originals are manually placed on the original carriage by the operator. The manner in which the originals are placed may be more or less rough. At this time, steps 74 and 75 are both skipped. The flow in this case is shown by broken line. At step 76, preliminary original scanning is effected. At step 77, the latches 41 and 42 are set. At step 71, actual reading and scanning are effected. The original discharge control at step 72 is likewise skipped. The other steps are similar to those described above.

In the present embodiment, the peak detecting operation and the scanning width are controlled in accordance with the detection of the size of the original and the supported position thereof, but it is possible to control the selection of the copying paper of the printer or the image processing such as the control of the magnification of the image on the basis of the result of said detection.

In the present embodiment, description has been made of the detection of the predetermined size effected by using two sensors to detect the size of the original, but the other sizes of originals than the predetermined size can be detected by increasing the number of sensors as described above or by using an LED array or the like. In that case, with regard also to the detection of the peak value of the original, the detection range can likewise be set accurately.

The present invention is not restricted to the above-described embodiment, but various modifications are possible within the scope of the invention as defined in the appended claims.

What I claim is:

1. An image processing apparatus comprising:
   reading means for reading an original and outputting an image signal;
   conveying means for conveying the original to a predetermined reading position;
   selecting means for selecting operation of said conveying means;
   first detecting means for detecting a size of the original based upon the output signal of said reading means; and second detecting means for detecting a size of the original conveyed by said conveying means; and control means for controlling said second detecting means to detect a size of the original during operation of said conveying means.

2. An image processing apparatus according to claim 1, wherein said reading means includes means for scanning the original, and wherein said first detecting means detects the size of the original during a pre-scan.

3. An image processing apparauts according to claim 1, wherein said control means inhibits operation of said first detecting means upon the operation of said conveying means.

4. An image processing apparatus according to claim 1, further comprising means for detecting the density of the original and means for controlling an area of the original where the density is detected which area is selected in response to the size detected by at least one of said detecting means.

5. An image processing apparatus comprising:
reading means for reading an origial and outputting an image signal;
detecting means for detecting a density of the original based upon an output of said reading means; and
control means, responsive to the original, for controlling an area of the original to be detected by said detecting means;
said control means controlling said detecting means such that said detecting means detects the density of an inner area of the original.

6. An image processing apparatus according to claim 5, further comprising means for detecting a size of the original and wherein said control means controls said detecting means in accordance with the detected size of the orginal.

7. An image processing apparatus according to claim 6, further having means for automatically detecting a size of the original.

8. An image processing apparatus according to claim 5, wherein said detecting means detects a maximum density of the original.

9. An image processing apparatus according to claim 5, wherein said detecting means detects a minimum density of the original.

10. An image processing means according to claim 5, further comprising means for detecting a supported position of the original with respect to a predetermined read position, wherein said control means controls said density detecting means in accordance with the detected supported position of the original.

11. An image processing apparatus according to claim 5, further comprising decision means, responsive to the density detected by said detecting means, for deciding a processing condition for processing the image signal output from said reading means.

12. An image processing apparatus according to claim 11, wherein said processing condition is a threshold for binarizing the image signal.

13. An image processing apparatus comprising:
reading means for reading an original and outputting an image signal
first, detecting means for detecting a size of the original; and
second detecting means for detecting a density of the original in response to the output signal of said reading means;

wherein said second detecting means is controlled in response to the size of the original detected by said first detecting means.

14. An image processing apparatus according to claim 13, wherein said control means controls said second detecting means to control a detection area of the original.

15. An image processing apparatus according to claim 13, wherein said control means controls a detection time of said second detecting means.

16. An image processing apparatus according to claim 13, wherein the detection by said first detecting means is executed prior to a detection by said second detecting means.

17. An image processing apparatus according to claim 13, further comprising decision means, responsive to the density detected by said second detecting means, for deciding a processing condition for processing the image signal output from said reading means.

18. An image processing apparatus according to claim 17, wherein said processing condition is a threshold for binarizing the image signal.

19. An image processing apparatus according to claim 13, wherein said second detecting means detects a maximum density of the original.

20. An image processing apparatus according to claim 13, wherein said second detecting means detects a minimum density of the original.

21. An image processing apparatus comprising
a platen for supporting an original thereon;
reading meanc for reading the original and outputting an image signal;
first detecting means for detecting a supported position of the original on said platen;
second detecting means for detecting a density of the original in response to the output signal from said reading means; and
control means for controlling said second detecting means in response to the supported position detected by said first detecting means.

22. An image processing apparatus according to claim 21, wherein said control means controls said second detecting means to control an area necessary to detect the density of the original.

23. An image processing apparatus according to claim 21, wherein said control means controls a detection time for said second detecting means.

24. An image processing apparatus according to claim 21, wherein a detection by said first detecting means is executed prior to a detection by said second detecting means.

25. An image processing apparatus according to claim 21, wherein said second detecting means detects a maximum density of said original.

26. An image processing apparatus according to claim 21, wherein said second detecting means detects a minimum density of said original.

27. An image processing apparatus according to claim 21, further comprising decision means, responsive to the density detected by said second detecting means, for deciding a processing condition for processing the image signal output from said reading means.

28. An image processing apparatus according to claim 27, wherein said processing condition is a threshold for binarizing the image signal.

29. An image processing apparatus comprising:
feeding means for feeding an original to a predetermined position where the original is read;

reading means for reading the original fed to the predetermined position and for outputting an image signal;

first detecting means for detecting a size of the original while being fed by said feeding means;

second detecting means for detecting a density of the original being fed by said feeding means in response to the image signal of said reading means; and control means responsive to the size of the original, for controlling an area of the original to be detected by said second detecting means.

30. An image processing apparatus according to claim 29, further comprising decision means, responsive to the density detected by said second detecting means, for deciding a processing condition for processing the image signal output from said reading means.

31. An image processing apparatus according to claim 30, wherein said processing condition is a threshold for binarizing the image signal.

32. An image processing apparatus comprising conveying means for conveying an original to a predetermined reading position;

first detecting means for detecting the size of an original at the reading position;

second detecting means for detecting the size of the original which is being conveyed by said conveying means;

scanning means for scanning the original at the reading position; and control means for controlling said scanning means in response to an output from either one of said first and second detecting means.

33. An image processing apparatus according to claim 32, further comprising density detecting means for detecting the density of the original at the reading position and control means for controlling said density detecting means in response to the output from either one of said first and second detecting means.

34. An image processing apparatus according to claim 32, wherein said control means controls said scanning means in response to the output from said second detecting means when said conveying means is utilized.

35. An image processing apparatus according to claim 32, wherein said control means controls said scanning means in response to the output from said first detecting means when said conveying means is not utilized.

36. An image processing apparatus according to claim 32, wherein said control means controls a scanning distance of said scanning means.

37. An image processing apparatus according to claim 32, further comprising image forming means for forming an image of the original scanned by said scanning means on a recording medium, wherein said control means controls an image forming magnification of the image in response to either one of the outputs from said first and second detecting means.

38. An image processing apparatus according to claim 32, further comprising image forming means for forming an image of the original scanned by said scanning means on a recording medium, wherein said control means selects the size of the recording medium in response to either one of the outputs from said first and second detecting means.

39. An image processing apparatus according to claim 32, wherein said scanning means comprising reading means for reading the original in order to output an image signal and wherein said first detecting means detects the size of the original in response to the image signal output by said scanning means by prescanning the original.

* * * * *

UNITED STATES PATENT AND TRADEMARK OFFICE
CERTIFICATE OF CORRECTION

PATENT NO. : 4,737,856
DATED : April 12, 1988
INVENTOR(S) : KATSUICHI SHIMIZU

It is certified that error appears in the above-identified patent and that said Letters Patent is hereby corrected as shown below:

IN THE DRAWINGS

Sheet 2, Figure 3, "OPARATION" should read --OPERATION--.
    Sheet 4, Figure 4B, "OPARATION" should read --OPERATION--.

COLUMN 2

Line 11, "conceptional" should read --conceptual--.
    Line 64, "stop" should read --stops--.

COLUMN 3

Line 17, "conceptional" should read --conceptual--.

COLUMN 5

Line 36, "become" should read --becomes--.

COLUMN 7

Line 26, "B5or" should read --B5 or--.

COLUMN 8

Line 68, "and" should be deleted.

COLUMN 9

Line 10, "apparuats" should read --apparatus--.
    Line 21, "origial" should read --original--.
    Line 36, "orginal." should read --original.--.
    Line 46, "means" should read --apparatus--.

UNITED STATES PATENT AND TRADEMARK OFFICE
CERTIFICATE OF CORRECTION

PATENT NO. : 4,737,856
DATED : April 12, 1988
INVENTOR(S) : KATSUICHI SHIMIZU

Page 2 of 2

It is certified that error appears in the above-identified patent and that said Letters Patent is hereby corrected as shown below:

COLUMN 9 (continued)

Line 63, "signal" should read --signal;--.
    Line 64, "first," should read --first--.

COLUMN 10

Line 29, "comprising" should read --comprising:--.

COLUMN 11

Line 21, "comprising" should read --comprising:--.

COLUMN 12

Line 30, "comprising" should read --comprises--.

Signed and Sealed this

Twenty-third Day of May, 1989

Attest:

DONALD J. QUIGG

Attesting Officer    Commissioner of Patents and Trademarks